United States Patent
Hartmann et al.

(10) Patent No.: US 7,873,451 B2
(45) Date of Patent: Jan. 18, 2011

(54) AIR SUPPLY MECHANISM FOR A VEHICLE SEAT, AND METHOD FOR THE OPERATION THEREOF

(75) Inventors: Dietmar Hartmann, Deckenpfronn (DE); Karl Pfahler, Stuttgart (DE); Lothar Renner, Nufringen (DE)

(73) Assignee: Daimler AG, Stuttgart (DE)

( * ) Notice: Subject to any disclaimer, the term of this patent is extended or adjusted under 35 U.S.C. 154(b) by 721 days.

(21) Appl. No.: 11/630,243

(22) PCT Filed: Jun. 18, 2005

(86) PCT No.: PCT/EP2005/006613

§ 371 (c)(1),
(2), (4) Date: Nov. 27, 2007

(87) PCT Pub. No.: WO2006/000362

PCT Pub. Date: Jan. 5, 2006

(65) Prior Publication Data

US 2008/0300749 A1    Dec. 4, 2008

(30) Foreign Application Priority Data

Jun. 25, 2004 (DE) ............... 10 2004 030 705

(51) Int. Cl.
*B60N 2/56* (2006.01)
(52) U.S. Cl. .................. 701/36; 454/120
(58) Field of Classification Search .......... 701/36
See application file for complete search history.

(56) References Cited

U.S. PATENT DOCUMENTS 2,134,724 A * 11/1938 McClanahan et al. ......... 165/43

(Continued)

FOREIGN PATENT DOCUMENTS

DE    1 123 220    2/1962

(Continued)

OTHER PUBLICATIONS

International Search Report dated Nov. 17, 2006 with an English translation of the pertinent portion and PCT/ISA/237 (Eleven (11) pages).

(Continued)

*Primary Examiner*—Thomas G Black
*Assistant Examiner*—Shelley Chen
(74) *Attorney, Agent, or Firm*—Crowell & Moring LLP

(57) ABSTRACT

An air supply mechanism for a vehicle seat comprises a control device for driving a fan and a heating element connected downstream of the fan. When the vehicle is unlocked, a vehicle door is opened and/or a folding-top switch is actuated in order to open the folding-top, the control device causes a heating element to be preconditioned. When there is a switching-on signal for the air supply mechanism, the control device ends the preconditioning and switches on the heating element and the fan. The heating element and fan are subsequently regulated by the control device as a function of vehicle speed and external temperature. In this manner, a seat occupant does not experience an initial draft or a delayed switching-on reaction but rather experiences a pleasant warmth even immediately after the air supply mechanism is switched on.

8 Claims, 3 Drawing Sheets

U.S. PATENT DOCUMENTS

| | | | |
|---|---|---|---|
| 4,572,430 A | | 2/1986 | Takagi et al. |
| 5,002,336 A | | 3/1991 | Feher |
| 5,102,189 A | | 4/1992 | Saito et al. |
| 5,137,326 A | | 8/1992 | George |
| 5,918,930 A | * | 7/1999 | Kawai et al. ............ 297/180.13 |
| 5,921,100 A | * | 7/1999 | Yoshinori et al. ............. 62/244 |
| 5,934,748 A | * | 8/1999 | Faust et al. ............ 297/180.12 |
| 6,019,420 A | * | 2/2000 | Faust et al. ............ 297/180.14 |
| 6,059,018 A | * | 5/2000 | Yoshinori et al. ............. 165/42 |
| 6,105,667 A | * | 8/2000 | Yoshinori et al. ........... 165/202 |
| 6,186,592 B1 | | 2/2001 | Orizaris et al. |
| 6,291,803 B1 | * | 9/2001 | Fourrey ...................... 219/497 |
| 6,926,601 B2 | * | 8/2005 | Aoki et al. .................. 454/121 |
| 6,957,545 B2 | * | 10/2005 | Aoki ........................... 62/208 |
| 7,028,493 B2 | * | 4/2006 | Tomita et al. ................. 62/161 |
| 7,275,983 B2 | * | 10/2007 | Aoki et al. .................... 454/75 |
| 7,467,823 B2 | * | 12/2008 | Hartwich ............... 297/180.14 |
| 2001/0022222 A1 | * | 9/2001 | Aoki et al. .................. 165/203 |
| 2004/0053571 A1 | * | 3/2004 | Aoki et al. .................. 454/159 |
| 2004/0069483 A1 | * | 4/2004 | Natsume et al. ............. 165/204 |
| 2004/0076015 A1 | * | 4/2004 | Aoki et al. .................. 362/503 |
| 2004/0083745 A1 | * | 5/2004 | Tomita et al. ................. 62/161 |
| 2004/0098995 A1 | * | 5/2004 | Ito et al. ....................... 62/186 |
| 2004/0107713 A1 | * | 6/2004 | Aoki ........................... 62/208 |
| 2004/0176021 A1 | * | 9/2004 | Mills ........................... 454/143 |
| 2005/0238339 A1 | | 10/2005 | Bargheer et al. |
| 2006/0290175 A1 | * | 12/2006 | Hartwich ................. 297/180.1 |

FOREIGN PATENT DOCUMENTS

| | | |
|---|---|---|
| DE | 34 23 657 A1 | 3/1985 |
| DE | 36 09 095 C2 | 10/1986 |
| DE | 87 00 003.2 U1 | 4/1987 |
| DE | 39 25 809 A1 | 2/1991 |
| DE | 196 54 370 C1 | 1/1998 |
| DE | 197 03 516 C1 | 5/1998 |
| DE | 198 42 979 C1 | 12/1999 |
| DE | 199 53 385 A1 | 5/2001 |
| DE | 102 26 008 A1 | 1/2004 |
| JP | 54-99241 U | 7/1979 |
| JP | 56-14713 U | 2/1981 |
| JP | 61-253239 A | 11/1986 |
| JP | 63-222915 A | 9/1988 |
| JP | 1-99266 U | 7/1989 |
| JP | 3-64552 U | 6/1991 |
| JP | 6-76920 A | 3/1994 |
| JP | 7-266841 A | 10/1995 |
| JP | 10-193958 A | 7/1998 |
| JP | 2002-187471 A | 7/2002 |
| WO | WO 03/106215 A1 | 12/2003 |

OTHER PUBLICATIONS

Translator's English language abstract of JP 3-64552 U previously submitted on Jun. 27, 2008.
Mechanical English language abstract of JP 3-64552 U previously submitted on Jun. 27, 2008.
Translator's English language abstract of JP 1-99266 U previously submitted on Jun. 27, 2008.
Mechanical English language abstract of JP 1-99266 U previously submitted on Jun. 27, 2008.
Translator's English language abstract of JP 54-99241 previously submitted on Jun. 27, 2008.
Translator's English language abstract of JP 56-14713 U previously submitted on Jun. 27, 2008.
English language translation of DE 1 123 220 previously submitted on Jun. 27, 2008.
English language abstract of DE 36 09 095 previously submitted on Jun. 27, 2008.
English language translation of DE 87 00 003.2 U1 previously submitted on Jun. 27, 2008.
English language abstract of DE 39 25 809 A1 previously submitted on Jun. 27, 2008.
English language abstract of DE 34 23 657 A1 previously submitted on Jun. 27, 2008.

* cited by examiner

AIR SUPPLY MECHANISM FOR A VEHICLE SEAT, AND METHOD FOR THE OPERATION THEREOF

BACKGROUND AND SUMMARY OF THE INVENTION

This application claims the priority of German patent document 10 2004 030 705.9, filed Jun. 25, 2004 (International Application No. PCT/EP2005/006613, filed Jun. 18, 2005), the disclosure of which is expressly incorporated by reference herein.

The invention relates to an air supply mechanism for a vehicle seat and to a method for the operation thereof.

German patent document DE 102 26 008 A1 discloses an air supply mechanism for a vehicle seat of an open vehicle having at least one air discharging opening that is provided in the upper region of the vehicle seat and via which the head, shoulder and neck region of the seat occupant can be subjected to an air flow in order to reduce undesirable draft phenomena. The air flow can be regulated by means of a control device and, when the air supply mechanism is switched on, the air flow is set to a basic value as a function of an automatically detected external parameter value such as, for example, an external temperature, or a specified value which can be selected by the seat occupant. After the basis value is set, further setting of the air flow takes place as a function of an automatically detected further parameter value, for example, the driving speed. The two parameter values serve to set a low, average or high basic value of the air flow, such that the basic value is determined by an assigned blower speed of the fan and an assigned heating power of the heating element. Based on this basic value, the air flow is set as a function of the driving speed in such a manner that, as the driving speed increases (decreases), the air flow and therefore the blower speed and the heating power of the heating element are increased (decreased).

However, in the case of the above-described conventional vehicle seat with seat heating system and ventilation device (air supply mechanism), there is the problem that, immediately after the air supply mechanism is switched on and the seat heating system and ventilation device are activated relatively cool air arrives at the shoulder and neck region of the seat occupant, since the heating element is not yet at the full heating power. This results in the seat occupant experiencing a draft and therefore leads to a loss of comfort.

Furthermore, German patent document DE 198 42 979 C1 discloses a vehicle seat with seat heating system and ventilation device in which, each time the seat heating system is switched on, the control unit simultaneously activates the ventilation device for a defined period of time after the seat heating system is switched on. In this case, the seat heating system and the ventilation device are switched on at full power, and the power of the ventilation device is reduced asymptotically to a predetermined final value within a period of time. This final value can either be zero or a value predetermined manually depending on the sensation of heat. This results in a specific combination of seat heating and seat ventilation in the heating-up phase of the vehicle seat causing the rate at which the cushion heats up in comparison to just the heating of the seat to be doubled. The seat heating system comprises a plurality of electric heating wires that are laid in an upholstery padding of the cushion. The ventilation device has a plurality of miniature fans which are arranged in air ducts integrated in the cushion and draw air from the vehicle interior region located below the vehicle seat and blow it into a ventilation layer of the cushion located below the upholstery padding.

German patent document DE 197 03 516 C1 discloses a vehicle seat with seat heating system and ventilation device in which the control unit is connected on the input side to a temperature sensor arranged in the cushion, and on the output side to the seat heating system and the ventilation device. The ventilation device has a plurality of miniature fans that are integrated in a cushion pad, draw air from the vehicle interior region located below the vehicle seat and blow it into a ventilation layer that covers the cushion pad. The ventilation layer is composed of a spacer knit. The seat heating system comprises a plurality of heating coils that are in each case assigned to a miniature fan and are arranged together with the latter in a respective air duct formed in the cushion pad. The control unit drives the ventilation device and the seat heating system in various combinations of fan and heating stages as a function of a current cushion temperature and a predetermined desired cushion temperature.

In the case of a vehicle seat that is disclosed in German patent document DE 199 53 385 A1, which includes a seat heating system and ventilation device, an operating device is provided for the manual actuation of the seat heating system and of the ventilation device. If the ventilation device is switched on manually, the control unit regulates the seat heating system automatically as a function of the temperature of the seat surface. The ventilation device and the seat heating system can be switched in a stepwise manner and/or continuously by the operating device. Regulation takes place within the defined limits set by the occupant via the operating device. In order to prevent supercooling by the ventilation device, when the ventilation device is switched on, the heating device for heating the vehicle seat is regulated automatically as a function of the seat surface temperature.

Also in these conventional vehicle seats having a seat heating system and ventilation device, because the heating element is not yet at the full heating power when the seat heating system and ventilation device are switched on, the seat occupant experiences a draft, particularly when the ventilation device is initially operated at the maximum level and is then slowly switched down to a predetermined value.

One object of the present invention is to develop an air supply mechanism for a vehicle seat and a method for the operation thereof in such a manner that, even immediately after the air supply mechanism is switched on, the seat occupant does not experience any draft.

These and other objects and advantages are achieved by the air supply mechanism for a vehicle seat according to the invention, in which a heating element is preconditioned before the air supply mechanism for a vehicle seat is switched on. As a result, the temperature of the discharging air is pleasantly controlled immediately when the air supply mechanism is switched on, and the vehicle occupant feels a pleasant heat. No experience of a draft occurs.

Other objects, advantages and novel features of the present invention will become apparent from the following detailed description of the invention when considered in conjunction with the accompanying drawings.

DETAILED DESCRIPTION OF THE DRAWINGS

The air supply mechanism for a vehicle seat and the method according to the invention for the operation of the same will now be described in more detail below with reference to a preferred embodiment.

Figure 1:
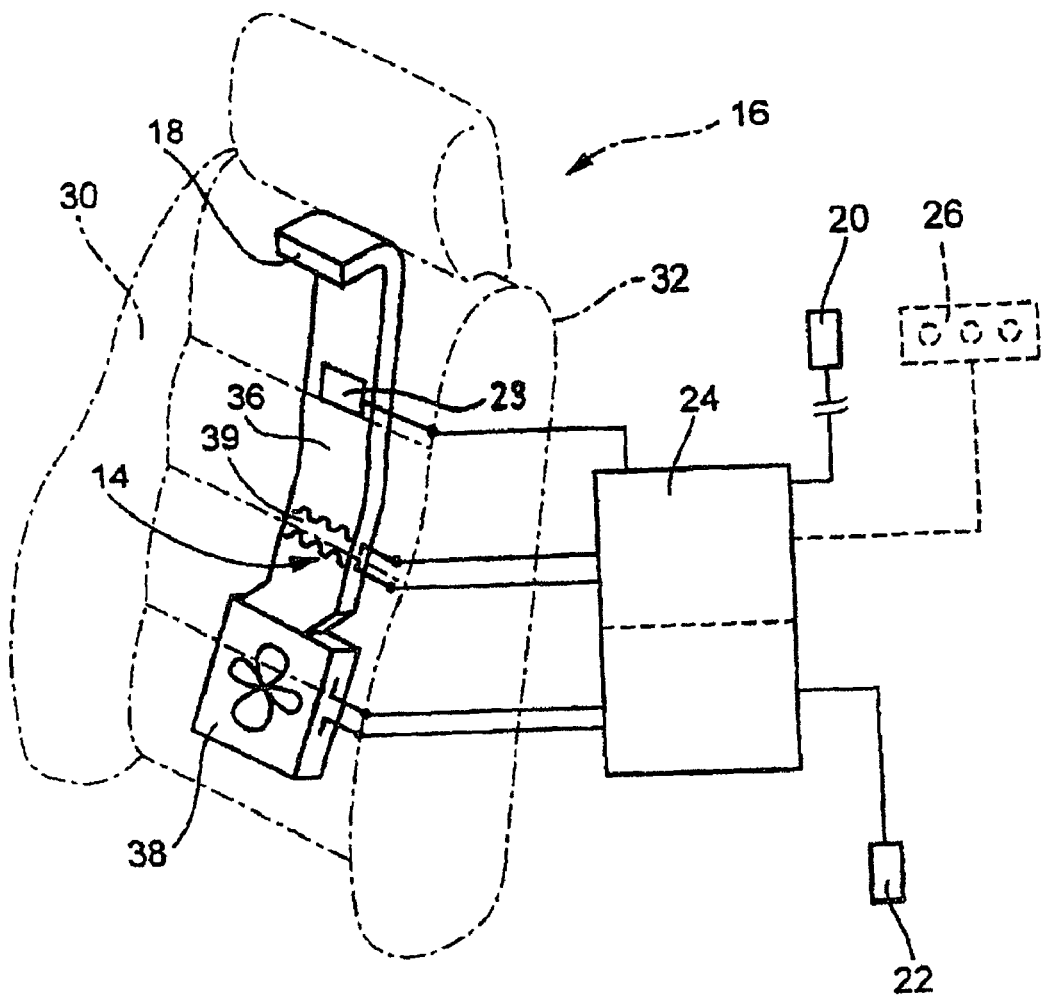
FIG. 1 is a diagrammatic perspective view of parts of a backrest of a vehicle seat in which an air supply mechanism according to the invention is integrated.

FIG. 1 illustrates, in a diagrammatic perspective view, parts of a backrest 16 of a vehicle seat 12 in which an air supply mechanism 14 according to the invention is integrated. Backrest 16 of the vehicle seat 12 includes a backrest frame 30 and a rear lining 32. A duct arrangement 36 of the air supply mechanism 14 is arranged within the backrest 16. Connected upstream of the duct arrangement 36 is a fan 38 that is held by a housing. The air intake of fan 38 is located on the rear side of the backrest 16. In addition, a heating element 39 is connected downstream of the fan 38 within the duct arrangement 36. The heating element 39 can be controlled via a control device 24 in order to control the temperature of the air flow of the air supply mechanism 14. In the region of the head restraint (not shown in FIG. 1), the duct arrangement 36 opens into an air discharging opening 18 through which the temperature-controlled air flow emerges in the direction of the head, shoulder and neck region of the seat occupant in order to considerably reduce the draft phenomena occurring, for example, when driving with the folding top open. The air discharging opening 18 ends in a manner integrated approximately flush with the front side of the head restraint.

The air supply mechanism 14 is connected both to a sensor 20 for detecting the external temperature and to a sensor 22 for detecting the driving speed. The two sensors 20, 22 are connected to the control device 24 that is arranged, for example, within the vehicle seat 12, and via which the air flow emerging from the air discharging opening 18 is regulated in the manner described below. In addition, a regulating device 26 is provided in the interior of the motor vehicle and is connected to the control device 24. Using the regulating device, a seat occupant can select a setting of the air flow. In the exemplary embodiment shown here, the driving speed is detected by an ABS control unit that converts the driving speed at a particular moment into an electronic signal and transmits it to the control device 24. The external temperature can be detected by a temperature sensor 20 that is present for indicating the temperature in the cockpit. The external temperature can be converted into an electronic signal and transmitted to the control device 24 in the vehicle seat 12.

According to an embodiment, as soon as the control device 24 receives a switching-on signal for the air supply mechanism, such as a signal from the manual actuation of a switch by the occupant, the heating element 39 is switched on and, at the same time, a timer such as a timer integrated in the control device 24, is started. This timer then runs for a dead time, $t_{DEAD}$. After this dead time, $t_{DEAD}$, expires, a signal is output to the control device 24. The dead time $t_{DEAD}$ is dimensioned in such a manner that a difference in time between switching on the air supply mechanism for a vehicle seat and a first detection of an air flow is as short as possible but nevertheless the temperature of the air flow is acceptable to the seat occupant and depends, inter alia, on the heating element 39 used. The fan 38 is driven by the control device 24 in response to the signal after the dead time $t_{DEAD}$ has expired. In this case, the driving of the fan 38 by the control device 24 takes place up to a predetermined working point $G_0$ on the basis of an automatically detected external parameter value, such as, for example, the external temperature and also, during the driving mode, at regular intervals in response to possible external temperature changes. The fan 38 is subsequently driven as a function of speed, i.e., as a function of the starting signal of the sensor 22 for detecting the driving speed, whereby, the fan voltage and therefore the blower speed n increase with increased driving speed. In this case, use can be made, for example, of a linear characteristic, i.e., the blower speed n is increased linearly in accordance with the increase of the driving speed.

However, as a result of the fact that the control device 24 initially drives the heating element 39 and only subsequently starts the fan 38 after the expiration of a predetermined dead time $t_{DEAD}$ in which the heating element 39 has been heated, the operation of the air supply mechanism for a vehicle seat is detected and experienced by the seat occupant with a delay or, alternatively, if the dead time $t_{DEAD}$ is selected to be short or too short, heating of the air flow is will not be optimal and the air flow will initially feel somewhat cool, which may lead to draft phenomena.

It is therefore aimed, in the preferred exemplary embodiment of the invention, to avoid a detectable delay until the start of the ventilation due to a dead time $t_{DEAD}$ or a draft phenomena due to too short a dead time $t_{DEAD}$. In addition, the dead time $t_{DEAD}$ is constant and is not dependent on the boundary conditions of the vehicle, which may result in an unpleasant blow-out air temperature.

To this end, according to one embodiment of the invention, the control device 24 is supplied with an information signal from a device such as a locking device (not shown) of the vehicle during unlocking of the vehicle, a folding-top switch, when it is actuated for opening purposes, and/or other comparable devices. After actuation of such a device, operation of the air supply mechanism for a vehicle seat could be desired by a seat occupant. Upon receiving the information signal, the control device 24 preconditions the heating element 39 independently of a switching-on signal for the air supply mechanism for a vehicle seat so that, as soon as the air supply mechanism for a vehicle seat is switched on, ventilation with hot air is possible. In this case, the preconditioning of the heating element 39 takes place either in a controlled manner by means of a temperature sensor 23 or a thermostat located in the air supply mechanism for a vehicle seat and connected to the control device 24, or in a temporally clocked manner using a clock generator that can be integrated in the control device 24 or the air supply mechanism for a vehicle seat. When the temperature sensor 23 or the thermostat is used, the control device 24 switches off the heating element 39 for example when a predetermined first temperature threshold value is reached, and switches on the heating element 39 when the temperature falls short of a predetermined second temperature threshold value. Otherwise, the switching on and off of the heating element 39 by the control device 24 takes place in response to a switching-on or switching-off signal from the clock generator.

Figure 2:
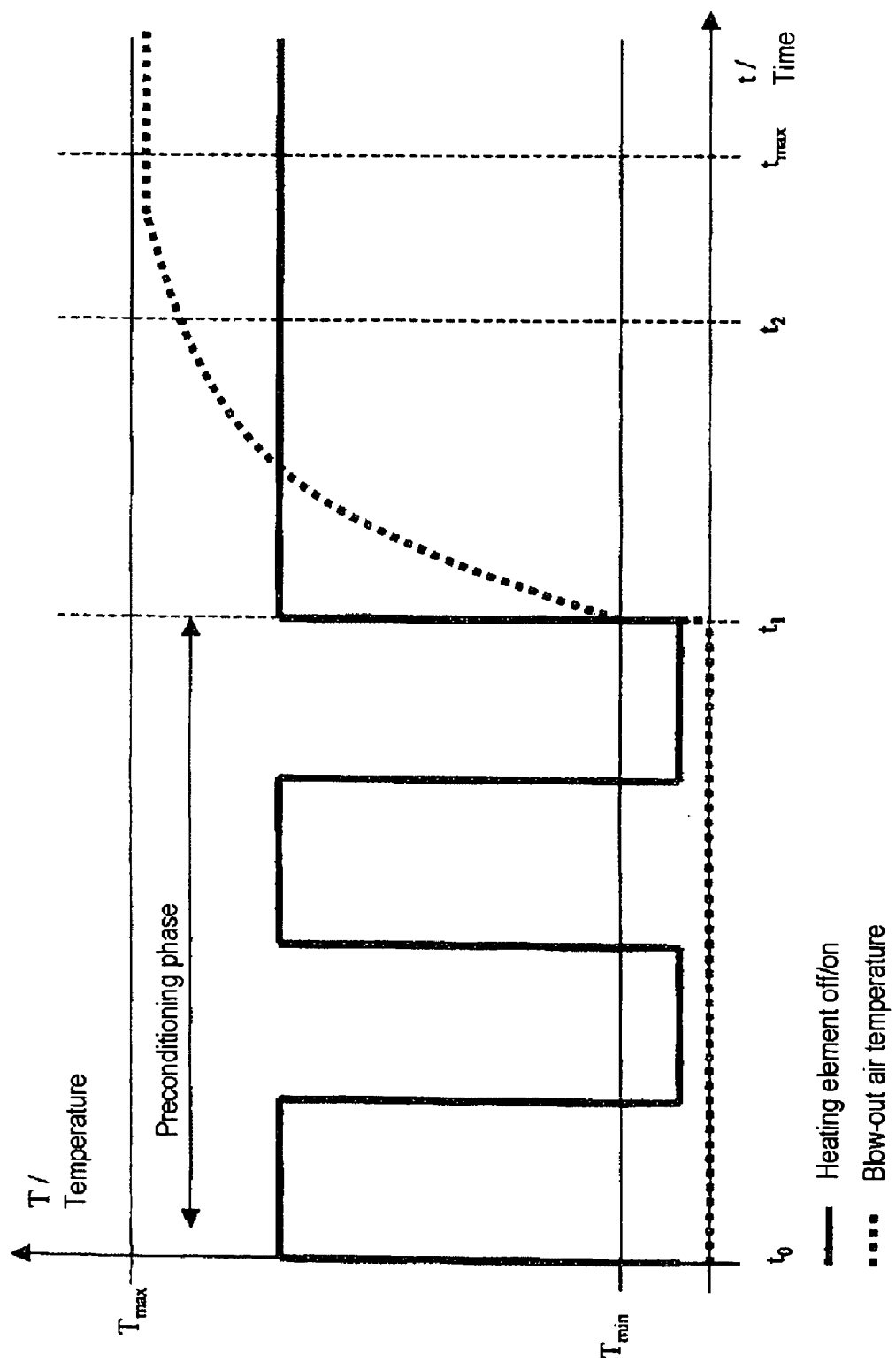
FIG. 2 is a heating characteristic according to the invention and the associated profile of the temperature of the blow-out air.

FIG. 2 shows the profile over time of a heating characteristic, i.e., of a switching on/off state, of the heating element 39 and of the associated temperature of the blow-out air for the vehicle seat air supply mechanism according to the invention. At a time $t_0$, when a condition for preconditioning the heating element 39 is met, such as, for example, by unlocking the vehicle, opening a vehicle door, actuation of a folding-top switch for opening the folding top, etc., the heating element 39 is switched on. Then, during a preconditioning phase before the air supply mechanism for a vehicle seat is activated by a seat occupant or automatically, the heating element 39 is cyclically switched on and then off again by the control device 24 for a predetermined period of time in each case when a clock generator is used, and otherwise when the temperature exceeds or falls short of a predetermined first or temperature threshold value. At the end of the preconditioning phase at a time $t_1$, after the air supply mechanism for a vehicle seat is switched on or activated, the heating element 39 and the fan 38 are switched on by the control device 24. At this time, the blow-out air is already at a temperature $T_{min}$ from which the vehicle occupant no longer perceives the blow-out air to be cool. At a time $t_2$, the temperature of the blow-out air increases continuously, on account of the continuous operation of the heating element 39, until a desired temperature $T_{TES}$ is reached. At a time $t_{max}$ i.e., at a theoretically maximum preconditioning time, a maximum temperature $T_{max}$ can be achieved.

Using the above-described vehicle seat air supply mechanism according to the invention, in particular the control device 24 for driving the heating element 39 is immediately active and can be experienced by the seat occupant. Above all, when the air supply mechanism is switched on, due to the preconditioning of the heating element 39, an optimum heating power is already obtained.

The control device 24 advantageously takes into consideration the starting signal of the temperature sensor 20, which gives information about the external temperature, in order to form a decision as to whether the above-described preconditioning of the heating element 39 is to take place. If the temperature falls short of a predetermined limit value of the external temperature, the above-described preconditioning of the heating element 39 takes place. The limit value can be selected, for example, in a manner specific to a particular country and at such a value that a seat occupant could desire the blow-out air to be heated. Likewise, the current internal temperature can be taken into consideration for a decision about preconditioning, since, for example, a seat occupant will likely not desire the blow-out air to be heated at a very high internal temperature.

On the basis of taking into consideration vehicle boundary conditions, such as, for example, vehicle external temperature and/or internal temperature, a blow-out air temperature can be obtained that is pleasant for the seat occupant such that the seat occupant is prevented from experiencing a draft.

Therefore, by means of the vehicle seat air supply mechanism according to the invention, the action of the air supply mechanism for a vehicle seat can be experienced actively and positively by a seat occupant directly after being switched on. Even directly after being switched on, the preconditioning gives rise to an optimum heating power taking the vehicle boundary conditions into consideration.

Figure 3:
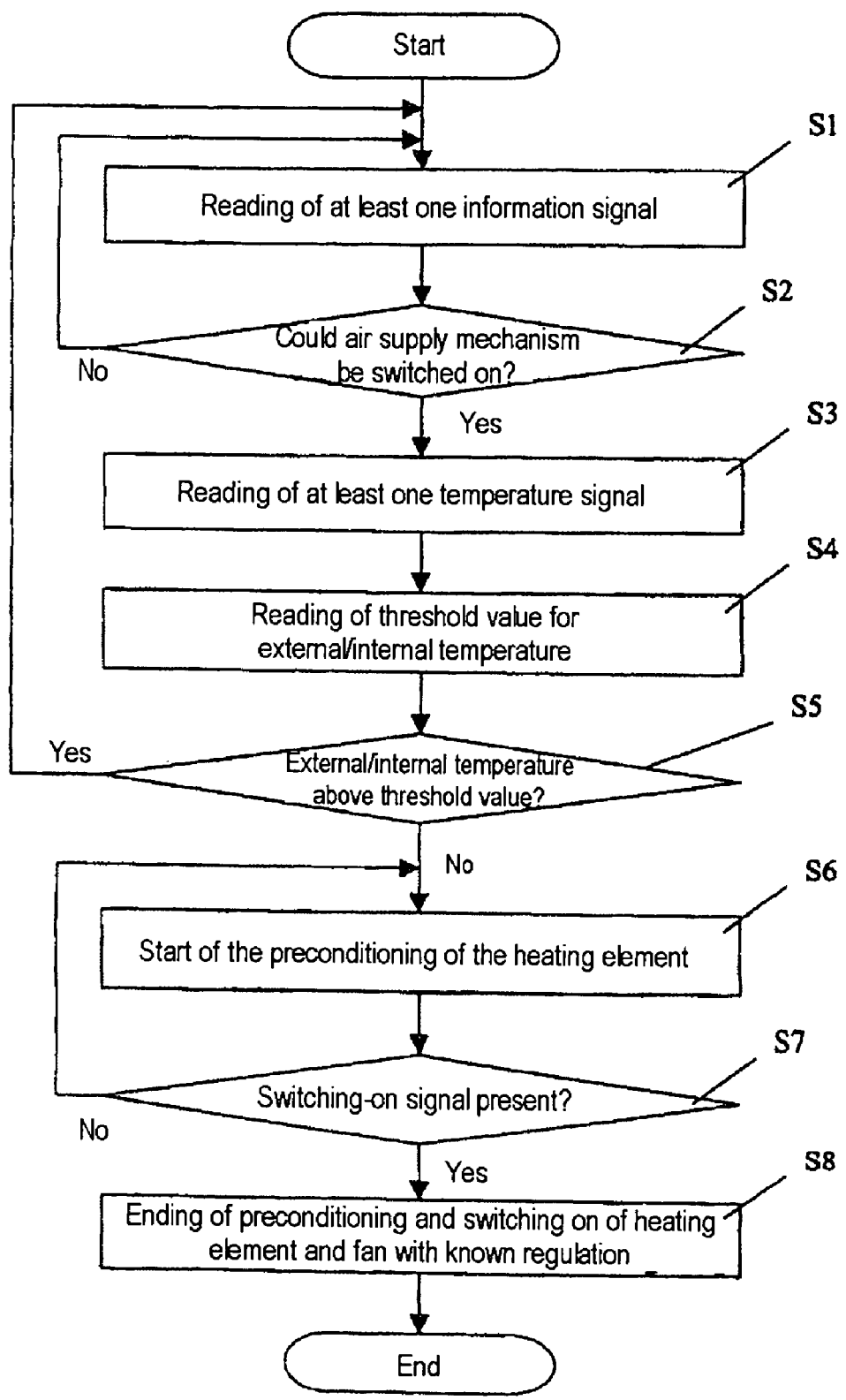
FIG. 3 is a flow diagram of a method according to the invention for the operation of an air supply mechanism for a vehicle seat.

The sequence of the method according to the invention for the operation of a vehicle seat air supply mechanism will now be discussed below with reference to FIG. 3.

The method according to the invention for the operation of an air supply mechanism for a vehicle seat starts whenever it can be assumed that the heating element 39 is too cold in order to ensure a minimum temperature of the blow-out air $T_{min}$. This is the case, for example, during each new starting of the engine, since the vehicle has then generally been standing for a certain period of time and the heating element 39 has not been heated.

After starting the method according to the invention for the operation of an air supply mechanism for a vehicle seat, first of all, in a step S1, information signals from an unlocking device, such as a door sensor and/or a folding-top switch, etc. are read. With reference to at least one of these information signals, it is decided in a step S2 whether a situation, such as for example, an unlocking of the vehicle, an opening of a vehicle door, an actuation of a folding-top switch for opening the folding top, or the like, is present, following which the air supply mechanism for a vehicle seat could be switched on either manually by a seat occupant or automatically. If this is not the case, the sequence returns to step S1. However, if this is the case, i.e., the vehicle has been unlocked, a vehicle door has been opened and/or a folding-top switch for opening the folding top has been actuated, or the like, an advance to step S3 is made, in which an external and/or an internal temperature of the vehicle detected by an external and/or internal temperature sensor is read. Alternatively, this step S3 can also already take place in conjunction with step S1.

Subsequently, in step S4, a threshold value for the external and/or internal temperature is read. The threshold value is stored in a memory device constructed, for example in the control device. This threshold value for the external and/or internal temperature is selected in such a manner that it can be assumed that, on account of the very high temperature, a seat occupant will not desire the blow-out air to be heated. Also, step S4 may already take place at the beginning of the method, but preferably, like step S3, for reasons of economy it is only carried out if it has been decided in step S2 that a situation is present in which the air supply mechanism for a vehicle seat could be switched on.

Subsequently, it is determined in step S5 whether the external and/or internal temperature read in step S3 is above the threshold value for the external and/or internal temperature read in step S4. If this is the case, i.e., it is assumed that heating of the blow-out air is not required, the sequence returns to step S1. Otherwise an advance is made to step S6.

In step S6, a preconditioning of the heating element 39 starts. The preconditioning comprises a cyclic switching on and off of the heating element. The cyclic switching is conducted in response to a clock generator or in response to a temperature at the temperature sensor 23 or thermostat exceeded or falling short of a first or second temperature threshold value, which are stored in a further memory device. As a result, when subsequently switched on, a minimum temperature of the blow-out air $T_{min}$ is ensured that is sufficient for the seat occupant not to experience any draft. Subsequently, it is checked in step S7 whether a manual or automatic switching-on signal for the air supply mechanism for a vehicle seat is present. If this is not the case, a return is made to step S6 and the preconditioning of the heating element 39 is continued. If, by contrast, a switching-on signal is present (manually or automatically), then an advance is made to step S8, in which the preconditioning is ended and the heating element 39 and the fan 38 are switched on. The operation of the heating element 39 and of the fan 38 are regulated in a known manner as a function of driving speed and external temperature. The method according to the invention is ended.

According to the above-described method for the operation of an air supply mechanism for a vehicle seat, by preconditioning the heating element in situations in which, after the engine of the vehicle is started, it can be anticipated that the air supply mechanism for a vehicle seat will be switched on, and it is ensured that, when said mechanism is switched on, the vehicle occupant immediately experiences the effect of the switching-on operation and, on account of the preconditioned heating element, also does not detect any sensation of draft. In addition, by taking the external and/or internal temperature into consideration for a decision about a preconditioning of the heating element, it is ensured that, in cases in which heating of the blow-out air will not be required, no unnecessary power is used for preconditioning the heating element.

It would also be conceivable, in the case of the device according to the invention and the method according to the invention, optionally to provide devices and steps through which, in addition to the external and/or internal temperature, for example also solar insolation and temperature values in the vicinity of the predetermined, stored threshold value, etc., are taken into consideration for a decision as to whether a situation is present in which preconditioning could be desired.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An air supply mechanism for a vehicle seat comprising:
    an air discharging opening located in an upper region of the vehicle seat and via which the head, shoulder and neck region of an occupant of the vehicle seat can be subjected to an air flow having reduced draft phenomena;
    a control device which regulates the airflow by regulating a blower speed of a fan; and
    a heating element adapted to heat the air flow; wherein the control device is supplied with at least one information signal from at least one of a closing device, a door sensor and a folding-top switch, regarding at least one of unlocking of the vehicle, opening of a vehicle door and an actuation of a folding top switch, in order to open the folding-top;
    the control device is provided with at least one temperature signal from a temperature sensor regarding an external or internal temperature; and
    the control device causes the heating element to be preconditioned independently of the air supply mechanism being switched on in response to the information signal and the temperature signal.

2. The air supply mechanism as claimed in claim 1, wherein the control device causes the heating element to be preconditioned only if the information signal indicates that one of an unlocking of the vehicle, an opening of a vehicle door and an actuation of a folding-top switch to open the folding top has taken place, and the temperature signal indicates that the external or internal temperature lie below at least one threshold value stored in advance in a memory device.

3. The air supply mechanism as claimed in claim 2, wherein after switching on the heating element for preconditioning in response to the information signal and the temperature signal, the control device switches the heating element on and off cyclically in response to a clock signal from a clock generator.

4. The air supply mechanism as claimed in claim 2, wherein:
    after switching on the heating element for preconditioning in response to the information signal and the temperature signal, the control device switches the heating element off in a cyclically repetitive manner in response to a starting signal of a temperature sensor or a thermostat, when a predetermined first temperature threshold value is reached, and switches the heating element on when the temperature is less than a predetermined second temperature threshold value; and
    the first temperature threshold value is greater than the second temperature threshold value.

5. The air supply mechanism as claimed in claim 1, wherein in response to a switching-on signal for switching on the air supply mechanism, the control device ends the preconditioning of the heating element and switches on the heating element and the fan and drives them as a function of driving speed.

6. A method for operating an air supply mechanism for a vehicle seat having an air discharging opening located in the upper region of the vehicle seat, via which the head, shoulder and neck region of an occupant of the vehicle seat can be subjected to an air flow with reduced draft phenomena, a control device adapted to regulate the air flow by controlling a blower speed of a fan, and a heating element adapted to heat the airflow, said method comprising:
    reading at least one information signal from one of a closing device, a door sensor and a folding-top switch regarding one of unlocking of the vehicle, opening of a vehicle door and actuation of a folding-top switch for opening a folding top;
    determining whether there is a situation for which the air supply mechanism is likely to be switched on either manually or automatically and if not, returning to the step of reading at least one information signal;
    otherwise, reading at least one external or internal temperature of the vehicle;
    reading at least one stored threshold value for the external or internal temperature;
    determining whether the read external or internal temperature lies above the stored threshold value, and if so, returning to the step of reading at least one information signal;
    otherwise, preconditioning the heating element by switching the heating element on and off cyclically;
    subsequently determining whether there is a manual or automatic switching-on signal for the air supply mechanism, and if not, returning to the step of preconditioning the heating element;
    otherwise, ending the preconditioning operation and switching on the heating element and the fan, regulating the operation of the heating element and of the fan as a function of driving speed and external temperature.

7. The method as claimed in claim 6, wherein the cyclic switching of the heating element on and off takes place in response to a clock signal from a clock generator.

8. The method as claimed in claim 6, wherein:
    the cyclic switching of the heating element on and off takes place in response to a starting signal of a temperature sensor or a thermostat such that the heating element is switched off when a predetermined first temperature threshold value is reached and is switched on when the temperature is less than a predetermined second temperature threshold value; and
    the first temperature threshold value is greater than the second temperature threshold value.

* * * * *